United States Patent [19]

Bieri

[11] Patent Number: 4,964,434

[45] Date of Patent: Oct. 23, 1990

[54] DUAL CONTROL VALVE SUITABLE FOR HIGH PRESSURE FLUIDS

[75] Inventor: Hans Bieri, Pfäffikon, Switzerland

[73] Assignee: Hydrostress AG, Pfäffikon, Switzerland

[21] Appl. No.: 475,145

[22] Filed: Feb. 5, 1990

[30] Foreign Application Priority Data

Feb. 17, 1989 [CH] Switzerland ........................ 00568/89

[51] Int. Cl.$^5$ ................................................ F16K 11/18

[52] U.S. Cl. .................................... 137/567; 137/569; 137/595; 137/607

[58] Field of Search ............... 137/595, 607, 637, 569, 137/567, 594; 251/310

[56] References Cited

U.S. PATENT DOCUMENTS

| | | | |
|---|---|---|---|
| 313,549 | 3/1985 | Stebbins | 251/310 X |
| 3,166,097 | 1/1965 | Hinderer et al. | 251/310 X |
| 3,529,621 | 9/1970 | Christiansen | 251/310 X |
| 3,543,790 | 12/1970 | Paige | 137/594 |
| 3,872,887 | 3/1975 | Wohlrab | 137/567 |
| 3,905,582 | 9/1975 | Fiorentini | 137/607 X |

FOREIGN PATENT DOCUMENTS

| | | | |
|---|---|---|---|
| 813156 | 5/1959 | United Kingdom | 137/594 |

*Primary Examiner*—Stephen M. Hepperle

*Attorney, Agent, or Firm*—Frishauf, Holtz, Goodman & Woodward

[57] ABSTRACT

The valve, preferably a dual control valve suitable for high pressure use, has a housing (2) formed with parallel bores in which rotatable valve elements (3,4) are located. The rotatable valve elements are each formed with a blind bore (22,23) coaxial therewith, and defining between an outer surface of the valve element and the blind bore a valve sleeve which communicates via lateral cut-outs (38,39) with inlets (11,12) to the blind bores. Valve sleeve portions (47,46) are left adjacent the cut-outs. The valve housing (2) is formed with outlet openings which can be exposed upon rotation of the valve elements to the remaining valve sleeve portions or to the cut-outs, respectively, to provide, selectively, CLOSED or OPEN positions of the respective valve elements. The housing and the valve elements are made of metal, the valve elements being fitted in the bore with slight amount of play. Pressure applied by a pressure fluid to the inside of the blind bores presses the respective valve sleeve portion against the outlet opening when it is rotated in CLOSED position. The valve elements (3,4) are coupled together for conjoint movement by gears (7,8,9), operated by a hand wheel (5).

20 Claims, 3 Drawing Sheets

DUAL CONTROL VALVE SUITABLE FOR HIGH PRESSURE FLUIDS

FIELD OF THE INVENTION

The present invention relates to a control valve having at least two rotary valve elements or valve cocks, and more particularly to a dual control valve suitable for use with highly pressurized fluids, especially hydraulic pressure liquids.

BACKGROUND

Control valves for hydraulic systems, and particularly when they are intended for operation with highly pressurized hydraulic liquids have problems with respect to sealing and overall weight. Sealing by means of rubber or rubbery sealing rings is difficult to maintain for an extended period of time when the system operates under high pressure, the seals being particularly difficult to maintain between relatively movable parts. High precision, interengaging control elements with tight tolerances can be made; such relatively movable elements, however, are very expensive to manufacture and even the smallest contaminants or particles within the hydraulic fluids can interfere with operation of tightly fitting relatively movable elements.

THE INVENTION

It is an object to provide a rotatable valve element or valve cock-type control valve suitable for high pressure use which maintains initially prepared seals for a long operating time, while being lighter weight than prior art structures.

Briefly, the valve structure comprises a housing which has at least two inlet connections adapted for coupling to a source of pressure fluid, and especially highly pressurized liquid. The inlets communicate with respective bores extending longitudinally into the housing. Each one of the bores communicates with an outlet which, in turn, can be coupled to a common manifold outlet from the housing. Rotatable valve elements, in the form of valve cocks or valve plugs are located in the bores. Each one of the rotatable valve elements is formed with a blind bore coaxial with the respective valve elements and defines between the outer surface of the valve elements and the blind bore a valve sleeve. The valve sleeve is formed with one or more lateral cutouts to communicate between the blind bore and a respective one of the outlets from the bore in the housing. The lateral cutouts of the valve elements and the outlet openings in the housing, with which the cutouts cooperate are relatively so positioned that, selectively, communication between the respective inlets and the outlets to the bore can be established, or inhibited in dependence on the rotary position of the rotatable valve element.

The arrangement does not require high precision fitting of relatively movable parts, namely the rotatable valve element and specifically the outer surface of the valve sleeve and the inner surfaces of the bores in the housing. Hydraulic pressure can be used to press the parts against each other; when the valve elements are made of metal, and the housing likewise of metal, slight elastic deformation of the valve sleeve, by the pressure of the pressurized fluid will provide for sealing. The system has the additional advantage that it is compact, and hence lightweight. This is particularly important when the valve system is to be used in portable or mobile equipment.

In accordance with a preferred feature of the invention, two bores are placed alongside each other in a common housing; more than two bores, and consequently more than two rotatable valve elements may be used.

In accordance with a further feature of the invention, the respective valve elements are formed with coaxial shaft extensions which have gears attached thereto, or formed thereon, for rotating the valve elements, for example conjointly by a central gear located between the gears of the individual valve elements.

DRAWINGS

DETAILED DESCRIPTION

The invention will be explained in connection with a dual valve unit which is used for selective connection of two pressure sources with a user, or utilization device, or selectively with a pressure-less drain or return line.

Figure 4:
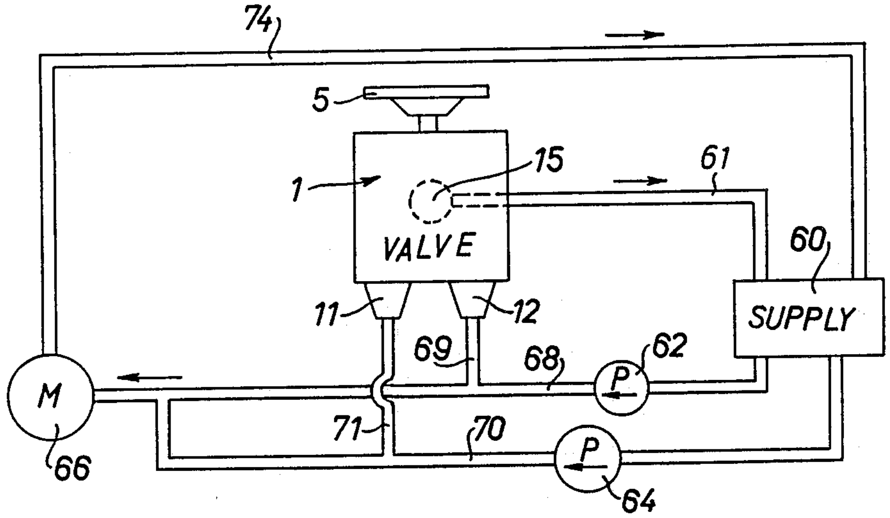
FIG. 4 is a schematic flow distribution diagram.

Referring first to FIG. 4: the control valve 1 has a bypass function. It is coupled to two pressure lines 68,70, by connecting coupling lines 69,71, respectively. The two pressure lines 68,70 are pressurized by connection with hydraulic fluid pumps 62,64, respectively. The pumps 62,64 provide different quantities of pressurized fluid or different pressures; consequently, the pumps 62,64 have been shown with symbols of different size.

The pumps 62,64 with the pressure line 68,70 are connected to a utilization device 66 shown as a hydraulic motor M. A drain or return line 74 extends from the motor M to a supply or sump of hydraulic fluid. The valve 1 has an outlet 15 which is coupled via a return or drain line 61 to sump 60. For control, the valve 1 functions as a bypass; when the valve 1 is shut off completely, pressurized fluid will reach the utilization device, e.g., the motor M.

Figure 1:
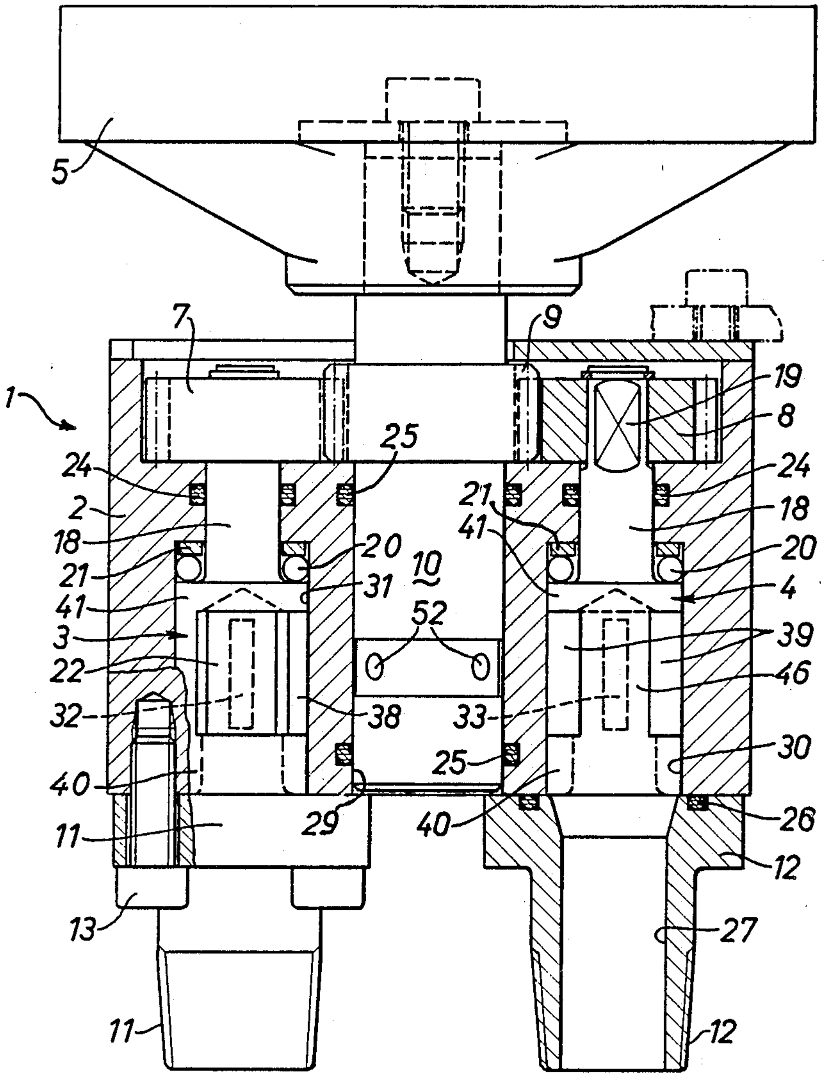
FIG. 1 is a vertical cross-sectional view through a dual control valve in accordance with the present invention.
Figure 2:
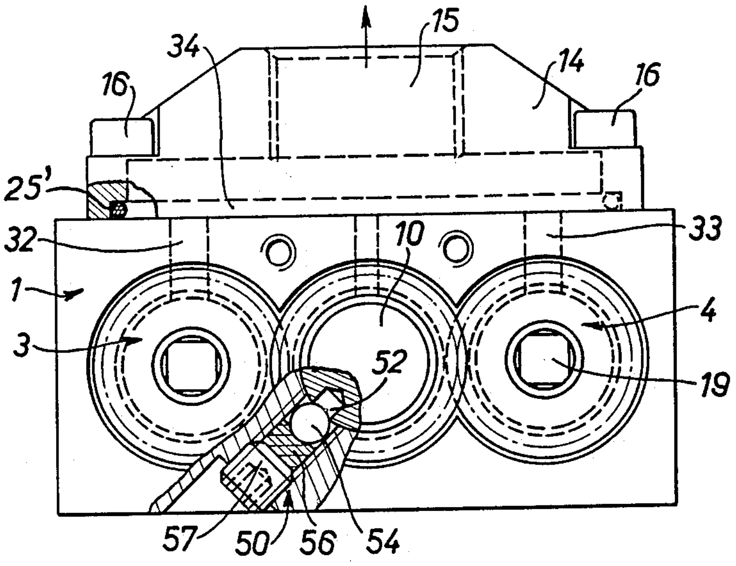
FIG. 2 is a tub view of the housing, with a partial sectional representation.
Figure 3:
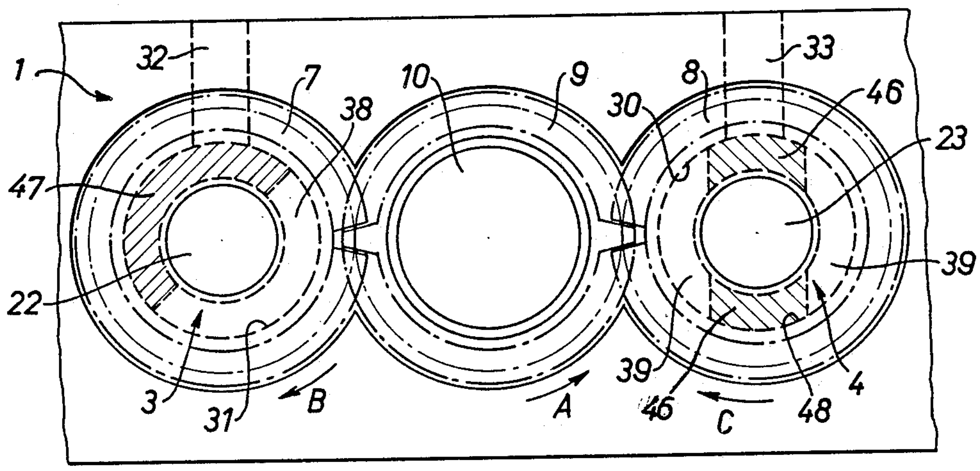
FIG. 3 is a cross-sectional view through the housing, in schematic form, and illustrating the position of the valve sleeves with fluid cut-off.

Referring next to FIGS. 1 to 3: The control valve 1 has a metallic housing 2 of, essentially block shape. Two metallic essentially cylindrical valve elements 3,4, in the shape of valve plugs or valve cocks, are located in valve bores 30,31 of the housing 2. The valve elements 3,4 are coupled to gears 7,8, respectively, which have gear teeth which mesh with a central control gear 9, manually controllable by a hand wheel 5. The gears 7,8 have the same number of gear teeth, so that upon rotation of gear 9 by hand wheel 5, the valve elements 3,4 will rotate about the same angular displacement.

The hand wheel 5 is carried by a shaft 10, to which the gear 9 is also attached to rotate therewith. Shaft 10 is fitted in a bore 2 of the housing 2.

At the side of the housing 2 opposite the hand wheel 5, two connecting stubs or couplings 11,12 are provided, which, for example by hoses or pipelines shown schematically in FIG. 4 at 71,69, can be connected to the respective pressure lines 70,68. The connecting couplings 11,12 are securely connected to the housing 2, for example by screws 13.

Hydraulic liquid is drained from the valve through a flange or manifold structure 14 (FIG. 2) which includes a thread 15 for coupling to a hose or pipe connected to the drain line 61 (FIG. 4). The flange body 14 is connected to the housing 1 by screws 16.

The valve elements 3,4 extend parallel to each other. Each one has a part cylindrical plug portion, and a shaft extension 18, which is of lesser diameter than the plug portion. Both of the plug portions have the same diameter. The upper end of the shaft extension 18 is of square cross-section, as seen at 19, to fit in a matching square opening in the respective gears 7,8. The plugs 3,4 are axially maintained and supported in position by ball race 20 which engages against a hardened washer 21. Both of the plugs 3,4, are formed with a central blind bore 22,23, respectively (see FIG. 3), which terminates in the respective plug portion in advance of the shaft extension 18 (see FIG. 1). A seal 24 is located in the region between the metal washer 21 and the gears 7,8. Further seals 25 are provided to seal the shaft 10 in the housing; seals 26 seal the engagement surfaces of the connecting stubs or couplings 11,12 against the housing 2. A further seal 25' (FIG. 2) is located between the flange 14 and the housing 2 (see FIG. 2).

The blind bores 22,23 within the plugs 3,4 communicate with couplings 11,12, are coaxial with the bores 27 and coaxial with the plugs 3,4. Valve sleeves are formed between blind bores 22,23 and the outside of the plugs 3,4. At the transition towards the housing, the bores 27 are conically expanded (see FIG. 1), so that, at the junction between the connecting surface of the respective stub or coupling 11,12, and the bore 30,31 in the housing, the interior diameters of the elements will be essentially equal.

The bores 30,31 in the housing 2 are formed (see FIG. 2) with respective outlet slits 32,33. The outlet slits terminate in a common outlet line 34 of the flange body 14, so that communication between the outlet slits 32,33 and the drain line 15 can be established, the outlet block or flange body 14 acting as an outlet manifold.

In accordance with a feature of the invention, the plugs or valve elements 3,4, are formed with differently shaped openings or cut-outs at the circumference thereof, communicating with the respective blind bores in the plugs or valve elements. The plug 3 has a cut-out 38 (see FIG. 3) extending over about half the circumference thereof, leaving a half cylindrical ring 47 in the region of the cut-out and below and above the region of the cutout 38, two ring portions 40,41. Upon rotation of the plug 3, the cut-out 38 can be placed in communication with the outlet slit 32 in the housing 2, to establish fluid connection between the outlet 15 and the inlet stub 11.

Plug 4 has two elongated cut-outs 39, located diametrically opposite each other, leaving a strip or ridge 46 which is wider than the width of the outlet slit or outlet duct 33 in the housing 2. Again, closed ring portions 40,41 are left below and above the respective cut-outs 39. Upon rotation of the plug 4, the cut-outs 39 permit fluid communication between the coupling or stub 12, the outlet slit 33, and the outlet coupling 15.

In contrast to the usual construction of the control valves of this type, requiring high precision fits between the bores of the housing and the plug elements, the plug elements 3,4 are fitted in the housing with bores 30,31 with a slight play. Preferably, there is a gap of between about 0.03 to 0.08 mm between the respective plugs 3,4 and the bores 30,31 of the housing, when the outlet slits 30 and 32 are blocked by the respective remaining portion 47 of the valve sleeve in the plug 3 or 46, respectively in the valve plug 4. When the outlet bores 30,31 are blocked, fluid pressure from the inside of the respective plugs against the valve sleeves provide sealing pressure against the remaining portions 47 and 46, respectively, to provide sealing pressure to form a metallic seal by elastic deformation of the respective plug 3,4.

A rotary stop arrangement 50 (FIG. 2) is associated with a shaft 10. Shaft 10 has four index positions, offset respectively from each other by 90°. Four circumferentially uniformly distributed recesses or depressions 52 are located on the shaft 10, in which a spring loaded ball 54 can engage. Ball 54 is supported by an elastic fill or a spring 56, held in a suitable bore by a compression spring 57. Upon rotation of the hand wheel 5, the ball 54 can snap into the respective depressions 52.

OPERATION

With reference to FIG. 4:

Four control positions are provided, which can be labeled positions I, II, III, IV. FIG. 3 illustrates the position of the plugs in a first, or I position, in which the plugs 3,4 close off communication between the pressure lines 70,68 of the pressure sources 64,62 and the drain. Thus, the control valve 1 will not drain off any pressurized fluid as applied directly to the motor M. Pressurized fluid is coupled to the valve via the coupling stubs 11,12 and enters the blind bores 22,23 of the rotary plugs 3,4. It cannot flow any further, however, since the valve sleeves 47 and 46, respectively, of the plugs 3,4 block the outlet openings 32,33 (see FIG. 3). The outlet openings 32,33 are connected to the pressure-less outlet opening 15 which, in turn, is connected via a return line 61 to the fluid supply or sump 60. The hydraulic pressure applied to the interior of the plugs 3,4, however, has the effect that the plugs 3,4 are pressed against the outlet openings 32,33 and thereby form a metal-to-metal seal. Rubber seals or the like are not necessary. In the plug 4, the slight play or gap between the circumference of the plug and the bore of the housing 30 forms a tiny narrow gap 48 which is sufficient to press the plug against the outlet opening or outlet slit 33 with powerful force.

A quarter-turn rotation of the hand wheel 5 in the direction of the arrow A (FIG. 3) moves the plugs 3,4 in unison. Plug 3 will rotate in the direction of the arrow B and plug 4 will rotate in the direction of the arrow C, both plugs 3 and 4 rotating about the same angle. Consequently, after this quarter rotation, the plug sleeve 47 of the plug 3 will continue to cover the outlet 32, whereas the cut-out 39 will provide communication with the outlet 33, so that pressurized fluid can flow from the blind bore 23 through the cut-out 39 to the outlet 33. Consequently, fluid from source 62 is directed to the pressureless return outlet 15, the valve functioning has a bypass. The utilization device M will not receive pressure from source 62, or the quantity of fluids applied by source 62.

Further rotation of the hand wheel by 90°, to a position III opens the semi-circular cut-out 38 in plug 3 to the outlet 32. Yet, the same 90° rotation covers the outlet 33 by the portion 46 of plug 4. This, then, provides for drainage of pressurized flow from pump 64 through lines 70,71 to the outlet, whereas the user 66 continues to be supplied with pressure fluid from pump 62.

Further rotation by 90°, corresponding to position IV opens the cut-out 39 to the outlet 33, while leaving the cut-out 31 also open to the outlet 32. Thus, the valve provides a bypass for both pressure lines 68 and 70 to the outlet 15, and no pressurized fluid will be supplied from the pumps 64,62 to the utilization apparatus 66. Position IV thus is selected when the user 66 should not receive any pressurized fluid at all.

FIG. 4 illustrates the control system with the valve therein. The two pumps 62,64 have different throughput and/or hydraulic pressure.

More than two plugs can be placed into a common housing, in which, preferably, all the plugs are identical. The outlets can communicate with a common outlet manifold, and the plugs, preferably, are coupled together by gears 7 and 8 and can be operated in unison by a common gear 9.

Customary check valves to provide spurious fluid paths, included for example in the pressure lines 68,70 downstream of the connecting lines 69,71 have been omitted from the drawing for clarity; the placement of such check valves and the like is well-known.

The control valve is particularly suitable for high-pressure hydraulic systems operating, for example, in the range of up to about 250 bar; of course, it can also be used for lower pressures. Hydraulic fluid is preferably used, such as an oilbased hydraulic fluid. If the material of the valve unit is noncorrosive, water or an emulsion may also be used.

The valve can be used, for example, in a concrete or stone crushing, apparatus, described in my U.S. application Ser. No. 07/280,381, filed Dec. 5, 1988, now U.S. Pat. No. 4,932,597 or U.S. Pat. No. 4,557,245, where the light weight of the valve, which can be coupled to a portable equipment for hydraulic coupling to external pressure sources, is particularly suitable, while permitting connection to various, e.g., mobile pressure sources. The disclosure of this application and patent is hereby incorporated by references.

Various changes and modifications may be made within the scope of the inventive concept.

I claim:

1. Multi control valve suitable for high pressure fluid use comprising a housing (2), said housing being formed with two inlet means (11, 12), each adapted for connection to a source (64, 62) of highly pressurized fluid;

two bores (30, 31) formed in the housing, wherein the respective bores (30, 31) and the respective valve elements (3, 4) therein are located in the housing with the axes of the bores in essentially parallel alignment, each bore communicating with a respective one of the inlet means;

two outlet openings (32, 33) formed in said housing, each communicating with a respective one of said bores;

a rotatable valve element (3, 4) located in each of said bores, each rotatable valve element (3, 4) having four control positions, offset by 90° relative to each other and being formed with a blind bore (22, 23) coaxial with the respective valve element and defining, between the outer surface of the valve element and said blind bore, a valve sleeve, said valve sleeve element communicating with a respective one of the inlet means, and said valve sleeve being formed with at least one lateral cut-out (38, 39) communicating with a respective blind bore;

wherein said lateral cut-outs (38, 39) of the valve elements (3, 4) and said outlet openings (32, 33) in the housing (2) are respectively positioned to, selectively, establish communication between the respective inlet means and the associated outlet opening communicating with the respective one of said bores to establish an OPEN position of the respective valve element, or inhibit said communication by placing a portion (46, 47) of the valve sleeve adjacent the respective cut-out (39, 38) of the valve sleeve adjacent the respective outlet openings to establish a CLOSED, or blocked position;

wherein said portion (47) of the valve sleeve of one (3) of said valve elements is, in cross-section, essentially semi-circular, whereby said cut-out will be essentially semi-circular;

wherein the portion (46) of a second one (4) of said valve elements form two diametrically opposite sleeve portions, and the cut-outs (39) form diametrically opposite communicating openings between said blind bore (23) in said element and the circumference thereof, whereby said first valve element will define two adjacent circumferential positions, 90° offset relative to each other, which establish the OPEN positions and the CLOSED positions, and the second valve element (4) will establish two sequential OPEN-CLOSED positions offset 90° relative to each other; and wherein pressure of the pressurized fluid within the blind bore presses against the respective outlet opening to effect a tight seal thereagainst.

2. The valve of claim 1, further including movable operating means (7, 8) coupling said first and second valve elements (3, 4) to each other; and means (5, 9, 10) for conjointly rotating said movable operating means, to move said valve elements (3, 4) in synchronism, and establish the following control positions:

I, in which the sleeve portions (46,47) of both valve elements are in CLOSED, or blocked position;

II, in which the sleeve element (46) of the second one (4) of said valve elements is in said OPEN position, whereas the portion (47) of the valve sleeve of the first valve element (3) continues in CLOSED position;

III, in which the portion (46) of the valve sleeve of the second valve element (4) is again in CLOSED position, whereas the portion (47) of the valve sleeve of the first valve element (3) elements form two diametrically opposite sleeve portions, and the cut-outs (39) form diametrically opposite communicating openings between said blind bore (23) in said element and the circumference thereof, whereby said first valve element will define two adjacent circumferential positions, 90° offset relative to each other, which establish the OPEN positions and the CLOSED positions, and the second valve element (4) will establish two sequential OPEN-CLOSED positions offset 90° relative to each other.

3. The valve of claim 2, wherein said means for conjointly rotating said valve elements comprises an operating element (5);

a shaft (10) extending into the housing (2) and being rotatably retained therein; and drive means (9) fixed on the shaft and operatively coupled to said movable operating means (7, 8) coupled to the respective valve elements (3, 4).

4. The valve of claim 3, including stop means (52,54,56,57) secured to the housing and operatively coupled thereto, to the shaft (10) for positively establishing said positions (I-IV), relatively offset 90° with respect to each other.

5. The valve of claim 1, wherein said valve elements (3,4) are fitted in said bores (30,31) with a very slight clearance or play, to permit free rotation of said valve elements, while effecting a tight seal upon elastic deflection of the portion (46,47) of the valve sleeve against the wall of the bore (30,31) within which it is rotatable, by fluid pressure from said fluid pressure source.

6. The valve of claim 1, wherein the housing is a generally block-shaped structure having inlet stubs or couplings (11,12) forming said inlet means (11,12), said inlet couplings being essentially coaxial with the blind bores (22,23) of said valve elements (3,4);

and fluid coupling means (14,34,15) connected to the two outlet openings (32,33) and including a common outlet connection (15), the axes of the outlet openings (32,33) extending at an essentially right angle with respect to the axes of the inlet means (11,12).

7. The valve of claim 6, wherein said outlet means (14,34,15) is located on an axis parallel to the axes of said outlet openings (32,33).

8. The valve of claim 1, wherein said control valve forms a bypass valve, and comprises a drain or outlet coupling (15) in fluid communication with said outlet openings (32,33) for, essentially pressure-less draining of pressurized fluid from the pressure source through the respective ones of said valve elements when the respective valve element is in OPEN position.

9. The valve of claim 1, wherein at least a wall portion of said bores (30,31) and the valve sleeves are made of metal, with slight play or clearance of the valve elements (3,4) in the respective bores, of between about 0.02 to 0.1 mm.

10. A pressure fluid system having two pressure sources (62, 64);

a supply source (60) of fluid, coupled to the pressure sources;

high pressure connecting lines (68, 70) extending from said pressure sources to a pressure utilization device (M; 66);

a drain connection (74) from said pressure utilization device to the supply source (60); and a bypass valve (1), wherein said bypass valve comprises the control valve claimed in claim 1, and wherein the two inlet means (11, 12) of said valve are coupled to respective ones of said high pressure connecting lines, and the outlet openings (32, 33) are coupled (15, 61) to said supply source.

11. The system of claim 10, wherein said pressure fluid comprises a hydraulic pressure fluid, and said valve is a hydraulic valve.

12. The system of claim 10, wherein said valve elements (3,4) are conjointly rotatable through four positions (I-IV) offset relative to each other by about 90°, said four positions providing, selectively:

(I) pressure fluid from both pressure sources (62,64) to the pressure utilization device, upon moving both valve elements into CLOSED position;

(II) pressure from one (64) of said pressure sources to said pressure utilization device by permitting drainage through said valve (1) by one (4) of said valve elements;

(III) pressure from the other one (62) of said pressure sources by permitting drainage through said valve by the other one (3) of said valve elements and bypassing pressure fluid from the first one (62) of said pressure sources; and (IV) drainage of pressurized fluid from both of said pressure sources through both of the valve elements (3,4) of said valve, thereby bypassing all pressurized fluid from said pressure utilization device (66).

13. The system of claim 10, wherein at least a wall portion of said bores (30,31) and the valve sleeves are made of metal, with slight play or clearance fit of the valve elements (3,4) in the respective bores, in the order of between about 0.02 to 0.1 mm.

14. The system of claim 10, including movable operating means coupling said first and second valve elements (3, 4) to each other for conjoint rotation, comprising gearing means (7, 8), and means for conjointly rotating said gearing means including a shaft (10) operatively coupled to said gearing means, extending into the housing, and being rotatably retained therein.

15. The valve of claim 2, wherein said movable operating means coupling the first and second valve elements (3, 4) to each other comprises gearing means (7, 8) and said means for conjointly rotating said movable operating means comprises a shaft (10) operatively coupled to said gearing means, extending into the housing, and being rotatably retained therein.

16. The valve of claim 15, including a gear (9) coupled to said shaft (10) and meshing with both said gearing means (7, 8) associated with respective valve elements.

17. Multi control valve suitable for high pressure fluid use comprising a housing (2), said housing being formed with two inlet means (11, 12), each adapted for connection to a source (64, 62) of highly pressurized fluid;

two bores (30, 31) formed in the housing, the axes of said bores being in essentially parallel alignment and each bore communicating with a respective one of the inlet means;

two outlet openings (32, 33) formed in said housing, each communicating with a respective one of said bores;

two rotatable valve elements (3, 4) arranged in each of said bores, each said rotatable valve elements being formed with a blind bore (22, 23) coaxial with the respective valve element and defining, between the outer surface of the valve element and said blind bore, a valve sleeve, said valve sleeve communicating with a respective one of the inlet means, said valve sleeve being formed with at least one lateral cut-out (38, 39) communicating with a respective blind bore; and wherein said lateral cut-outs (38, 39) of the valve elements (3, 4) and said outlet openings (32, 33) in the housing (2) are respectively positioned to, selectively, establish communication between the respective inlet means and the associated outlet opening communicating with the respective one of said bores to establish an OPEN position of the respective valve element, or inhibit said communication by placing a portion (46, 47) of the valve sleeve adjacent the respective cut-out (39, 38) of the valve sleeve adjacent the respective outlet openings to establish a CLOSED, or blocked position;

rotary drive means (7, 8, 9) coupling said valve elements (3, 4) to each other;

means (5, 9, 10) for conjointly rotating said rotary drive means, to move said valve elements (3, 4) in synchronism, including an operating element (5); and a shaft (10) extending into the housing (2), being rotatably retained therein and coupled to said rotary drive means for conjointly moving said valve elements (3, 4); and a drain or outlet coupling (15) in fluid communication with said outlet openings (32, 33) for, essentially pressure-less draining of pressurized fluid from the pressure source through the respective ones of said valve elements (3, 4) when the respective valve element is in OPEN position.

18. The valve of claim 17, wherein each valve element (3, 4) has four control positions, offset by 90° relative to each other;

and wherein said portion (47) of the valve sleeve of one (3) of said valve elements is, in cross-section, essentially semi-circular, whereby said cut-out will be essentially semi-circular; and wherein the portion (46) of a second one (4) of said valve elements form two diametrically opposite sleeve portions, and the cut-outs (39) form diametrically opposite communicating openings between said blind bore (23) in said element and the circumference thereof, whereby said first valve element will define two adjacent circumferential positions, offset 90° relative to each other, which establish the OPEN positions and the CLOSED positions, and the second valve element (4) will establish two sequential OPEN-CLOSED positions offset 90° relative to each other and upon conjoint rotation of said valve elements (3, 4) by said gearing means (7, 8, 9) will establish the following control positions:

I, in which the sleeve portions (46,47) of both valve elements are in CLOSED, or blocked position;

II, in which the sleeve element (46) of the second one (4) of said valve elements is in said OPEN position, whereas the portion (47) of the valve sleeve of the first valve element (3) continues in CLOSED position;

III, in which the portion (46) of the valve sleeve of the second valve element (4) is again in CLOSED position, whereas the portion (47) of the valve sleeve of the first valve element (3) is moved to place the cut-out (38) thereof in communication with the respective outlet opening (32) to place it in OPEN position; and IV, in which the cut-out (39) adjacent the portion (46) of the valve sleeve of the second element is again moved in OPEN position opposite the respective outlet opening (33), and the cut-out (38) of the valve sleeve of the first valve element (3) is still in communication with the respective outlet opening (32) and also in OPEN position.

19. Multi control valve suitable for high pressure fluid use comprising a housing (2), said housing being formed with inlet means (11,12), each adapted for connection to a respective source (64, 62) of highly pressurized fluid;

at least two bores (30,31) formed in the housing, each communicating with a respective one of the inlet means;

at least two outlet openings (32,33) formed in said housing, each communicating with a respective one of said bores;

a rotatable valve element (3,4) located in each of said bores, each rotatable valve element being formed with a blind bore (22,23) coaxial with the respective valve element and defining, between the outer surface of the valve element and said blind bore, a valve sleeve, said valve sleeve communicating with a respective one of the inlet means, and said valve sleeve being formed with at least one lateral cut-out (38,39) communicating with a respective blind bore; and wherein said lateral cut-outs (38,39) of the valve elements (3,4) and said outlet openings (32,33) in the housing (2) are respectively positioned to, selectively, establish communication opening communicating with the respective one of said bores to establish an OPEN position of the respective valve element, or inhibit said communication by placing a portion (46,47) of the valve sleeve adjacent the respective cut-out (39,38) of the valve sleeve adjacent the respective outlet openings to establish a CLOSED, or blocked position, the respective bores (30, 31) and the respective valve elements (3, 4) therein being located in the housing with the axes of the bores in essentially parallel alignment;

means for conjointly rotating said valve elements including rotary operating means (7, 8) coupled to the respective valve elements (3, 4);

an operating element (5);

a shaft (10) coupled to the operating element, extending into the housing (2) and being rotatably retained therein; and rotation transfer means (9) fixed on the shaft and coupled to the rotary operating means (7, 8) coupled to the respective valve elements (3, 4);

inlet stubs or couplings (11, 12) on said housing forming said inlet means (11, 12) said inlet couplings being essentially coaxial with the blind bores (22, 23) of said valve elements (3, 4);

fluid coupling means (14, 34, 15) connected to the at least two outlet openings (32, 33) and including a common outlet connection (15), the axes of the outlet openings (32, 33) extending at an essentially right angle with respect to the axes of the inlet means; and wherein said control valve forms, in selected positions, a pressure source-to-drain bypass valve when said drain or outlet coupling (15) is in fluid communication with said outlet openings (32, 33) for, essentially, pressure-less draining of pressurized fluid from the respective source (64, 62) of high pressured fluid through the respective one of said valve elements when the respective valve element (3, 4) is in OPEN position.

20. A pressure fluid system having a plurality (62, 64) of pressure sources;

a supply source (60) of fluid, coupled to the pressure sources;

high pressure connecting lines (68, 70) extending from said pressure sources to a pressure utilization device (M; 66);

a drain connection (74) from said pressure utilization device to the supply source (60); and a bypass valve (1), wherein said bypass valve comprises the control valve claimed in claim 21, and wherein the inlet means (11, 12) of said valve are coupled to respective ones of said high pressure connecting lines, and the outlet openings (32, 33) are coupled (15, 61) to said supply source (60).

* * * * *